(12) United States Patent
Tan et al.

(10) Patent No.: US 10,119,860 B2
(45) Date of Patent: Nov. 6, 2018

(54) METHOD FOR CALIBRATING ABSOLUTE RESPONSIVITY OF TERAHERTZ QUANTUM WELL DETECTOR AND DEVICE THEREOF

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Zhiyong Tan, Shanghai (CN); Juncheng Cao, Shanghai (CN); Li Gu, Shanghai (CN); Yonghao Zhu, Shanghai (CN)

(73) Assignee: SHANGHAI INSTITUTE OF MICROSYSTEM AND INFORMATION TECHNOLOGY, CHINESE ACADEMY OF SCIENCES, Changning District, Shanghai (CN)

( * ) Notice: Subject to any disclaimer, the term of this patent is extended or adjusted under 35 U.S.C. 154(b) by 249 days.

(21) Appl. No.: 15/121,520

(22) PCT Filed: Apr. 30, 2014

(86) PCT No.: PCT/CN2014/076639
§ 371 (c)(1),
(2) Date: Aug. 25, 2016

(87) PCT Pub. No.: WO2015/127715
PCT Pub. Date: Sep. 3, 2015

(65) Prior Publication Data
US 2018/0216994 A1 Aug. 2, 2018

(30) Foreign Application Priority Data
Feb. 26, 2014 (CN) .......................... 2014 1 0066672

(51) Int. Cl.
*G01J 1/42* (2006.01)
*G01J 1/08* (2006.01)
*G01J 3/42* (2006.01)

(52) U.S. Cl.
CPC ............... *G01J 1/4257* (2013.01); *G01J 1/08* (2013.01); *G01J 1/4228* (2013.01); *G01J 3/42* (2013.01); *G01J 2001/083* (2013.01)

(58) Field of Classification Search
None
See application file for complete search history.

(56) References Cited

U.S. PATENT DOCUMENTS

| 8,208,505 B2 * | 6/2012 | Dantus | G01B 9/02014 250/281 |
| 2013/0266034 A1 * | 10/2013 | Yu | B82Y 20/00 372/27 |
| 2014/0103904 A1 * | 4/2014 | Tan | G01J 1/4257 324/97 |

FOREIGN PATENT DOCUMENTS

| CN | 102323040 A | 1/2012 |
| CN | 102721468 A | 10/2012 |
| JP | 2003075251 A | 3/2003 |

OTHER PUBLICATIONS

Zhang Pei, Research on Spectral Response Testing System for QWIP, Information Science 1-8 and technology, 1135-29, ISSN 1674-0246, pp. 49-55.

* cited by examiner

*Primary Examiner* — Paresh Patel
(74) *Attorney, Agent, or Firm* — Global IP Services; Tianhua Gu

(57) ABSTRACT

A calibration method for an absolute responsivity of a terahertz quantum well detector and a calibration device thereof, in which the device at least comprises: a driving power supply, a single frequency laser source, an optic, a terahertz array detector, a terahertz dynamometer, a current amplifier and an oscilloscope. The calibration method adopts a power detectable single frequency laser source as a calibration photosource, to obtain the absolute responsivity (Continued)

parameters of the detector at the laser frequency; a normalized photocurrent spectrum of the detector is used to further calculate the absolute responsivity parameters of the detector at any detectable frequency. the single frequency laser source with periodically output is adopted as a calibration photosource, the terahertz array detector and the dynamometer are adopted to directly measure and obtain the incident power of the calibrated detector.

8 Claims, 3 Drawing Sheets

METHOD FOR CALIBRATING ABSOLUTE RESPONSIVITY OF TERAHERTZ QUANTUM WELL DETECTOR AND DEVICE THEREOF

CROSS REFERENCE TO RELATED PATENT APPLICATION

The present application is the US national stage of PCT/CN2014/076639 filed on Apr. 30, 2014, which claims the priority of the Chinese patent application No. 201410066672.2 filed on Feb. 26, 2014, which applications are incorporated herein by reference.

BACKGROUND OF THE PRESENT INVENTION

Field of Invention

The present invention belongs to the technical field of terahertz detector, and relates to a method calibrating for an absolute responsivity of a terahertz quantum well detector and a device thereof.

Description of Related Arts

A terahertz quantum well detector is a semiconductor detector having fast response speed, narrow response spectrum, small size and easy integration, which becomes a significant type of detector in the terahertz applied technology. Such type of detector was first developed by a Canadian scientist in 2004, and has been widely investigated due to its characteristics of simple material and structure, as well as large responsivity and the like. The detectable frequency range of the current device mainly covers a frequency band of 2-7 THz. The laser sources with a frequency band of 2-7 THz mainly include a terahertz quantum cascade laser and a carbon dioxide gas laser, wherein, due to its relative longer cavity length, the laser generated by the carbon dioxide gas laser has good single frequency property and high optical quality; while as for the terahertz quantum cascade laser, by means of an optimized device structure and technical preparation conditions, the outputted laser having stable frequency, and with a full width at half maximum of MHz of emission spectrum can also be achieved. Generally, the full width at half maximum of photocurrent spectrum of the terahertz quantum well detector is 1-2 THz, while the spectral width of a laser device is only a millionth of the spectral width of the calibrated detector, which may be approximately deemed as a single frequency laser source. Therefore, both the carbon dioxide gas laser and the terahertz quantum cascade laser are available to be considered as a calibration source for the absolute responsivity of the terahertz quantum well detector.

Responsivity is one of the important parameters for measuring the working performance of the terahertz quantum well detector. In the conventional responsivity calibration method, the standard black-body is served as a calibration radiation source, combining with a chopper, a current amplifier and a lock-in amplifier, a response amplitude of a device to the black-body radiation under a certain chopping frequency can be obtained, then a radiation energy of the standard black-body at a certain temperature is calculated, and a radiation power arrived at the sensitive surface of the detector is calculated by a solid angle between the sensitive surface of the detector and the black-body radiation, followed by performing integration on a photocurrent spectrum of the detector, to obtain a ratio of a photocurrent spectrum integration at the peak detected frequency, finally, according to the ratio, the radiation power arrived at the sensitive surface of the detector, and the response amplitude displayed on the lock-in amplifier, as well as the sensitivity (i.e., magnification factor) of the amplifier, the peak responsivity of the detector is calculated. In the above method, the detector features narrow-spectrum detectivity at terahertz frequency band, but the material system for fabricating the detector is GaAs/AlGaAs, and the actual fabricated detector has a certain response on infrared light and visible light, as a result, when adopting a standard black-body as a calibrating radiation source, the infrared light and the stray visible light in the environment (especially the infrared light) has large influence on the responsivity calibration of the device at terahertz frequency band; secondly, the calibration process is generally performed under atmospheric environment, while in the atmosphere, the terahertz radiated absorption peaks by water vapor are distributed at a plurality of frequency points of the photocurrent spectrum of the detector, which may not be simply calculated by air transmittance value, but requiring to perform a comparison between the absorption spectrum of the water vapor and the photocurrent spectroscopy followed by an integration difference to deduct the absorbent influence of the water vapor in the atmosphere; since the absorption spectrum of the water vapor varies dramatically with the ambient temperature and humidity, in the calibration process, rapid rotation of the chopper would have large disturbance to the environment, with the result of relative large deviation in the step of the deduction of the water vapor absorption, thus the calculated detector responsivity has a relative large difference with the actual value; finally, since the detector requires to work under a low temperature condition, the effect of windows of a cooling Dewar on the responsivity measurement also requires the integral differential calculation from the angle of spectrum.

Therefore, it is necessary to provide a novel method for calibrating absolute responsivity of a terahertz quantum well detector and a device thereof, so as to simplify the calibration process of the absolute responsivity parameter of the terahertz quantum well detector, and to improve the calibration accuracy and the calibration efficiency of the detector.

SUMMARY OF THE PRESENT INVENTION

In view of the above disadvantages in the prior art, the object of the present invention is to provide a calibration method for an absolute responsivity of a terahertz quantum well detector and a calibration device thereof, to solve the problems of low calibration accuracy and low calibration efficiency caused by complicated calibration process and large error in the prior art.

In order to achieve the above object and other related objects, the present invention provides a calibration device for absolute responsivity of a terahertz quantum well detector, at least comprising: a driving power supply, a single frequency laser source, an optic, a terahertz array detector, a terahertz dynamometer, a current amplifier and an oscilloscope;

the single frequency laser source is connected with the driving power supply, for radiating terahertz laser by the driving signal of the driving power supply;

the optic is placed at one side of the single frequency laser source, for converging the terahertz laser;

the terahertz array detector is placed at one side of the optic, for measuring a cross-sectional shape of a convergent spot at a convergent focal point of the terahertz laser;

the terahertz dynamometer is placed at one side of the optic, for measuring the total power of the convergent spot at the convergent focal point;

the current amplifier is used for powering the terahertz quantum well detector, and extracting and amplifying a loop current as a voltage signal;

the oscilloscope is respectively connected with the current amplifier and the driving power supply, for displaying and reading the voltage signal, a external trigger signal in the display process is a reference signal outputted by the driving power supply.

Optionally, the single frequency laser source is a terahertz quantum cascade laser or a carbon dioxide gas laser.

Optionally, the optic is a set of polyethylene lenses, at least including two polyethylene lenses.

Optionally, the driving power supply is a pulse signal generator.

Optionally, the oscilloscope is a digital oscilloscope, at least including two measurable channels.

The present invention further provides a method for calibrating an absolute responsivity of a terahertz quantum well detector by adopting the above device, which at least comprises the following steps:

S1: driving the single frequency laser source by a square signal of the driving power supply with an output period of t, to make the single frequency laser source radiate a terahertz laser with the same period of the driving signal, and with a frequency of f;

S2: adjusting the optic to a preset location, to make the terahertz laser reach a converging focal point through the optic;

S3: placing the terahertz array detector at the converging focal point, and measuring the cross-sectional shape of the convergent spot at the convergent focal point, to calculate the cross-sectional area S';

S4: placing the terahertz dynamometer at the convergent focal point, and measuring the total power P' of the convergent spot at the convergent focal point;

S5: placing the terahertz quantum well detector at the convergent focal point, and powering the terahertz quantum well detector by the current amplifier, and extracting and amplifying the loop current as a voltage signal U, using the oscilloscope to display and to read the voltage signal U, and serving the external trigger signal displayed on the oscilloscope as the reference signal outputted by the driving power supply, then adjusting the location of the terahertz quantum well detector to make the voltage signal U displayed on the oscilloscope reach a maximum value $U_{max}$;

S6: comparing the dimension of the convergent spot at the convergent focal point with the size of the photosensitive surface of the terahertz quantum well detector, and calculating the largest area S'' of the overlapable region therebetween, then incident laser power P on the sensitive surface of the detector is that:

$$P = \alpha P' \frac{S''}{S'}$$

wherein, $\alpha$ is a transmittance of the window of the cooling Duwar of the terahertz quantum well detector at the laser frequency f;

S7: according to the amplification sensitivity G of the current amplifier, the calculated photocurrent value generated by the terahertz quantum well detector is that $I = G \cdot U_{max}$; according to the received laser power P and the generated photocurrent value I by the terahertz quantum well detector, the responsivity value $R_f$ at the laser frequency f is obtained as:

$$R_f = \frac{G \cdot U_{max}}{P}$$

S8: according to the corresponding response amplitude a (a<1) in the normalized photocurrent spectrum of the terahertz quantum well detector at the laser frequency f, the absolute responsivity $R_{max}$ of the terahertz quantum well detector at the detected peak frequency $f_{max}$ is calculated as:

$$R_{max} = R_f \frac{1}{a}$$

and according to the corresponding normalized response amplitude b (b<1) at other frequency $f_j$, the absolute responsivity $R_j$ of the terahertz quantum well detector at the frequency is calculated as:

$$R_j = R_f \frac{b}{a}.$$

Optionally, in step S3, the cross-sectional area S' is calculated by a circular area approximated method.

Optionally, the sensitivity surface area of the terahertz dynamometer is larger than the area of the convergent spot; in step S4, the laser power measured by the terahertz dynamometer is the total power of the convergent spot, and the average power of the measured convergent spots is obtained, then the total peak power of the convergent spots is calculated as twice of the average power according to the duty ratio of 50% of the square signal.

From the above, the calibration method for an absolute responsivity of a terahertz quantum well detector and the calibration device thereof in the present invention has the following beneficial effects: in the calibration method of the present invention, since a single frequency laser source with periodically output is served as a calibration photosource, the periodicity of the photosource can be locked-in by means of the periodical sampling of the oscilloscope, thereby avoiding the random perturbed influence of infrared light and visible light in environment; during the calibration process, the water vapor absorption and the window absorption can be simplified as a single absorption coefficient due to the single frequency property of the light source, thereby avoiding the complicated integral differential calculation; moreover, the incident laser power of the calibrated detector is obtained by adopting the terahertz array detector and the dynamometer, which can further reduce the influence of water vapor absorption in the calibration process, so that the calibration results can be more accuracy. In the present invention, the absolute responsivity values at any frequency within the detectable frequency range can be obtained by the terahertz quantum well detector, which greatly improves the calibration accuracy and calibration efficiency of the detector, and has wide applicability.

Figure 1:
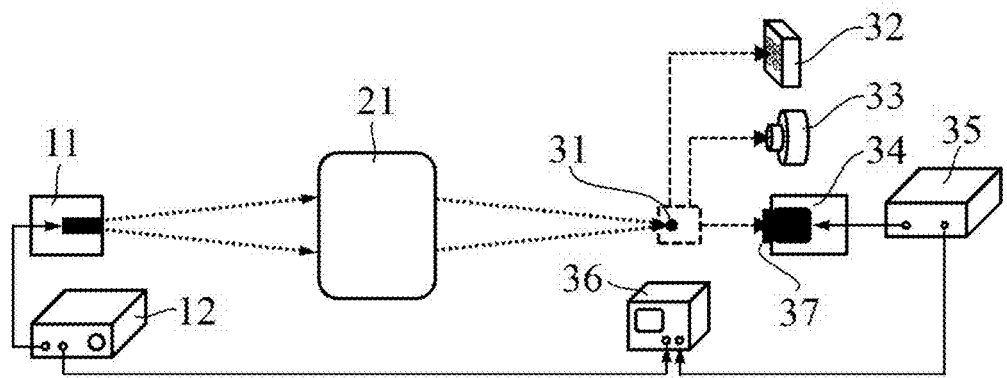
FIG. 1 is a schematic view showing the structure and optical path of a device for calibrating an absolute responsivity of a terahertz quantum well detector of the present invention.

ILLUSTRATIONS OF REFERENCE SIGNS 11 single frequency laser source
12 driving power supply
21 optic
31 convergent focal point
32 terahertz array detector
33 terahertz dynamometer
34 terahertz quantum well detector
35 current amplifier
36 oscilloscope
37 window

DETAILED DESCRIPTION OF THE PREFERRED EMBODIMENTS

The embodiment modes of the present invention are described hereunder through specific examples, and persons skilled in the art may easily understand other advantages and efficacies of the present invention from the contents disclosed in the present description. The present invention may be further implemented or applied through other different specific embodiment modes, and various modifications or amendments may also be made to each of the details in the present description based on different perspectives and applications without departing from the spirit of the present invention.

Please refer to FIG. 1 to FIG. 5. It is to be noted that the drawings provided in the present embodiment only explain the basic conception of the present invention in an illustrative manner, so the drawings only display the components relevant to the present invention rather than being drawn according to the number, shape and size of the components during actual implementation, the shape, number and scale of each component may be randomly changed during its actual implementation, and the layout of the components thereof might also be more complicated.

Embodiment 1

The present invention provides a device for calibrating an absolute responsivity of a terahertz quantum well detector, as shown in FIG. 1, which is shown to the structure and optical path of the device, at least comprising: a driving power supply 12, a single frequency laser source 11, an optic 21, a terahertz array detector 32, a terahertz dynamometer 33, a current amplifier 35 and an oscilloscope 36. FIG. 1 also shows the location of a terahertz quantum well detector 34 and a window 37, where the terahertz quantum well detector 34 is located in the optical path and is calibrated during the calibration process, and the window 37 is installed on a cooling Dewar of the terahertz quantum well detector 34. The role of the window 37 is to allow the transmission of the terahertz light, which is further converged on the sensitive surface of the terahertz quantum well detector 34.

As shown in FIG. 1, the single frequency laser source 11 serves as a calibrated laser source, which is connected with the driving power supply 12, and is used to radiate terahertz laser by the driving signal of the driving power supply 12. The terahertz laser is of single frequency, which avoids the integral differential calculation of the water vapor absorption and the window absorption with the photocurrent spectrum of the detector, so as to simplify the calibration process, and to reduce the calibration error caused by the changes of the temperature and humidity in environment. The single frequency laser source 11 is a terahertz quantum cascade laser or a carbon dioxide gas laser. In the present embodiment, preferably, the single frequency laser source 11 is a terahertz quantum cascade laser with a radio frequency of 3.902 THz.

The driving power supply 12 is a high power pulse signal generator, the square wave of which features a signal period of 5 ms and a signal amplitude of 21.5V and an output impedance matching of 400 kΩ when driving the terahertz quantum cascade laser for working, and the actual voltage amplitude loaded on the terahertz quantum cascade laser is 13.1V. The single frequency laser source 11 may adopt a periodic output manner, so as to avoid the effect caused by background light.

The optic 21 is placed at one side of the single frequency laser source 11, to converge the terahertz laser sent by the single frequency laser source 11. The optic 21 is a set of polyethylene lenses, at least including two polyethylene lenses, the focal length of each lens is 100 mm. FIG. 1 shows a convergent focal point 31, which is the focal point of the last lens in the optic 21.

The terahertz array detector 32 is placed at one side of the optic 21, to measure a cross-section shape of a convergent spot at the convergent focal point of the terahertz laser. As an example, the pixel of the terahertz array detector 32 is 320×240, and the size of one pixel is 23.5 µm.

The terahertz dynamometer 33 is placed at one side of the optic 21, to measure the total power of the convergent spot at the convergent focal point. The incident laser power value of the calibrated terahertz quantum well detector can be directly obtained by the terahertz dynamometer 33, which helps to reduce the effect of the water vapor absorption and more accuralize the calibration results. As an example, the terahertz dynamometer 33 features a detectable frequency range of 0.3-10 THz, a detected sensitive surface diameter of 12 mm, and a detectable power range of 0.05-3000 mW.

The current amplifier 35 is used for powering the terahertz quantum well detector 34, and extracting and amplify a loop current as a voltage signal. In the present embodiment, the current amplifier 35 is a low noise current amplifier with an amplification sensitivity of 50 µA/V, and an amplification bandwidth of 0.3 Hz-10 kHz.

The oscilloscope 36 is respectively connected with the current amplifier 35 and the driving power supply 12, for displaying and reading the voltage signal, the external trigger signal in the display process is the reference signal of the signal outputted by the driving power supply 12. The oscilloscope 36 is a digital oscilloscope, which at least includes two detectable channels; as an example, its parameters include four detectable channels, a detecting bandwidth of 500 MHz, and it is able to simultaneously display the driving voltage signal of the terahertz quantum cascade laser and the output signal of the current amplifier 35.

In the present invention, the device for calibrating the absolute responsivity of a terahertz quantum well detector adopts a single frequency laser source as a calibration light source, which avoids the integral differential calculation of the water vapor absorption and the window absorption with the photocurrent spectrum of the detector, so as to simplify the calibration process, to reduce the calibration error caused by the changes of the temperature and humidity in environment. The single frequency laser source may adopt a periodic output manner, thereby avoiding the effect caused by background light. The device of the present invention further adopts the terahertz array detector and the dynamometer to characterize the convergent spot, by which the actual incident laser power value for the calibrated detector can be directly obtained, as a result, the effect of the water vapor absorption can be further reduced, and the calibration results is more accuracy.

Embodiment 2

The present invention also provides a calibration method for an absolute responsivity of a terahertz quantum well detector. Hereinafter, combining with the device and each parameter in the embodiment 1, the specific process of the calibration method of the present invention will be explained in detail, which at least comprises the following steps:

S1: driving the single frequency laser source by a square signal of the driving power supply 12 with an output period of t, to make the single frequency laser source 11 radiate a terahertz laser with the same period of the driving signal, and with a frequency of f. In the present embodiment, for example, the single frequency laser source 11 is a terahertz quantum cascade laser, the square signal is t=5 ms, the laser frequency outputted by the terahertz quantum cascade laser is f=3.902 THz.

S2: adjusting the optic 21 to a preset location, to make the terahertz laser reach a converging focal point 31 through the optic 21.

S3: placing the terahertz array detector 32 at the converging focal point 31, and measuring the cross-sectional shape of the convergent spot at the convergent focal point 31, to calculate the cross-sectional area S'.

Figure 2:
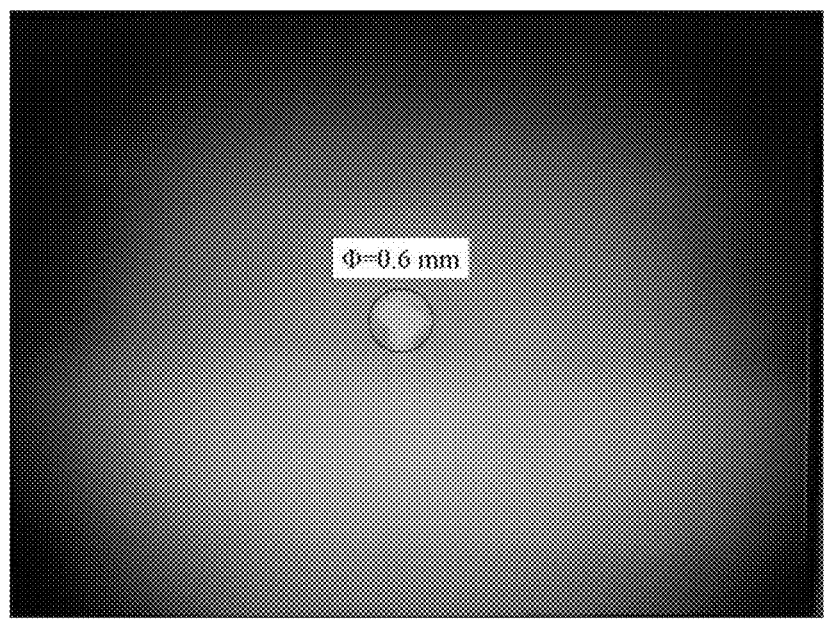
FIG. 2 is shown to a shape and side of a convergent spot at a convergent focal point.

Please refer to FIG. 2, which is shown to the shape and size of the spot at the convergent focal point. As shown in FIG. 2, the region within the black round is the spot region; by a circular area approximated method, it can be known that the sizes of the spot region are smaller than or equal to 0.6 mm along both transverse and longitudinal directions, as a result, taking the spot region as a circle with a diameter of Φ=0.6 mm, it can be calculated that S'=0.2826 $mm^2$.

S4: placing the terahertz dynamometer 33 at the convergent focal point 31, and measuring the total power P' of the convergent spot at the convergent focal point.

In the present embodiment, since the sensitive surface of the dynamometer (with a diameter of 12 mm) is much larger than the converging spot area, the laser power detected by the dynamometer is the total power of the converging spot. According to the measurement, the average power of the converging spot is 600 μW, then it can be calculated that the total peak value of the converging spot is P'=1200 μW, if the duty cycle of the square signal is 50%. S5: placing the terahertz quantum well detector 34 at the convergent focal point 31, and powering the terahertz quantum well detector by the current amplifier 35, and extracting and amplifying the loop current as a voltage signal U, using the oscilloscope 36 to display and to read the voltage signal U, and serving the external trigger signal displayed on the oscilloscope 36 as the reference signal outputted by the driving power supply 12, then adjusting the location of the terahertz quantum well detector 34 to make the voltage signal U displayed on the oscilloscope 36 reach a maximum value $U_{max}$.

As an example, the peak detecting frequency of the calibrated terahertz quantum well detector 34 is 3.21 THz, the working temperature is 3.2 K, the detectable frequency range is 2.6-6.6 THz (the normalized photocurrent spectrum amplitude is larger than or equal to 0.1), and the effective size of the photosurface of the terahertz quantum well detector 34 is 1.5 mm×0.9 mm.

Figure 3:
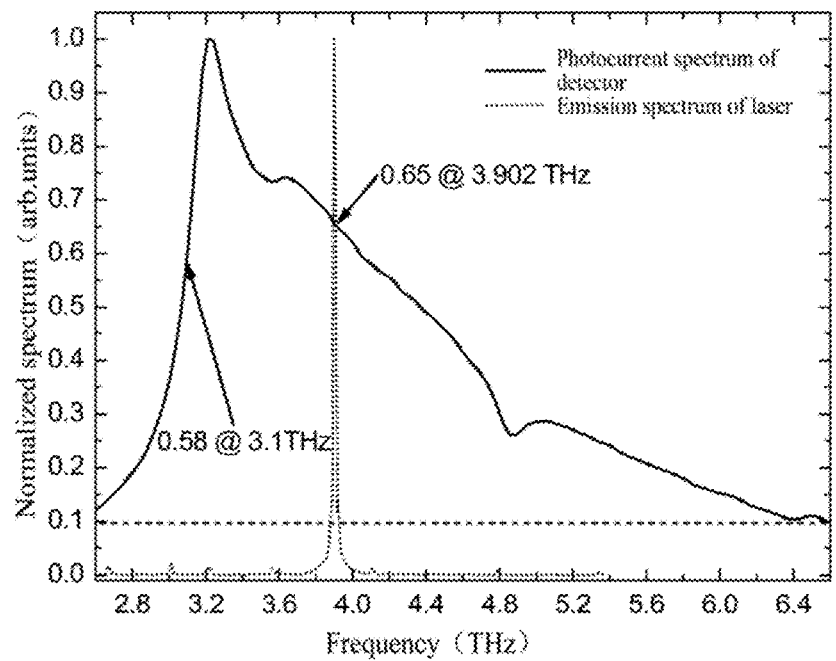
FIG. 3 is shown to a normalized comparison chart of an emission spectrum of a terahertz quantum cascade laser and a photocurrent spectrum of a terahertz quantum well detector.

Please refer to FIG. 3, which is shown to a normalized comparison chart of the emission spectrum of a terahertz quantum cascade laser and the photocurrent spectrum of a terahertz quantum well detector. As shown in FIG. 3, the normalized photocurrent spectrum amplitude is larger than or equal to 0.1 (see the dashed line in figure), wherein the normalized photocurrent spectrum amplitude at 3.902 THz is 0.65 (0.65@3.902 THz).

Figure 4:
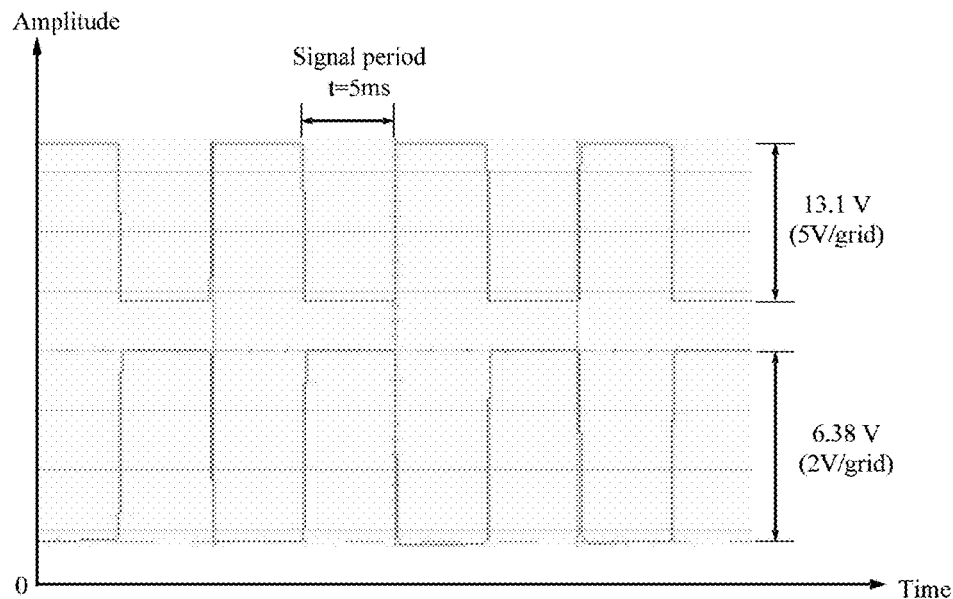
FIG. 4 is shown to a comparison chart of a signal waveform driven by a terahertz quantum cascade laser (upper) and a signal waveform outputted by a current amplifier (lower).
Figure 5:
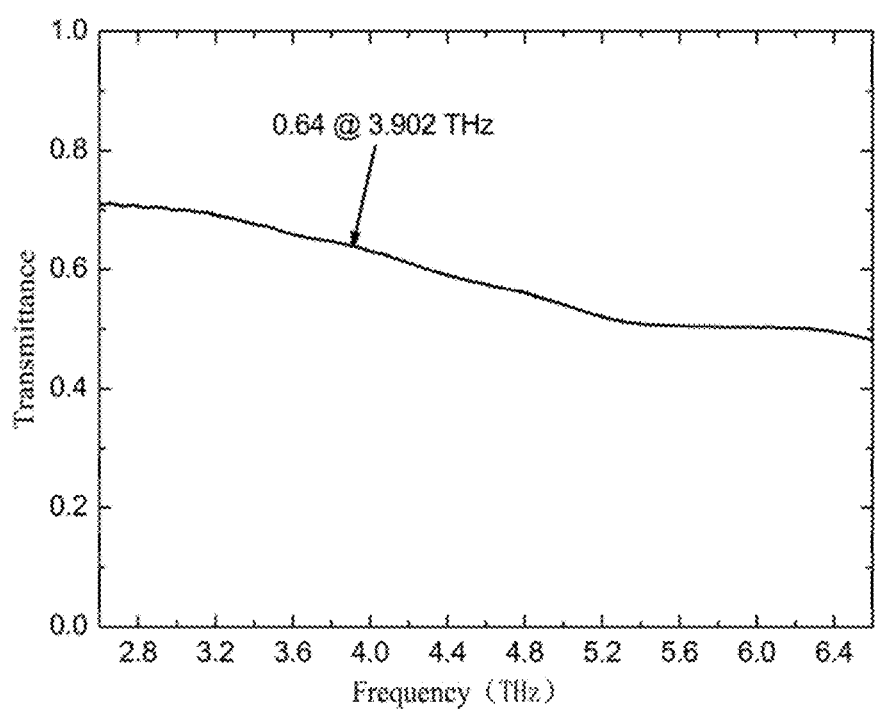
FIG. 5 is shown to a transmission spectrum of a window of a cooling Dewar of a terahertz quantum well detector.

As an example, the current amplifier is adopted to supply a direct-current bias of 40 mV for the terahertz quantum well detector. Please refer to FIG. 4, which is shown to a comparison chart of the signal waveform driven by a terahertz quantum cascade laser (upper) and the signal waveform outputted by a current amplifier (lower), wherein the signal period is t=5 ms, the unit of amplitude measurement of the driven signal waveform of the terahertz quantum cascade laser is 5 V per grid, the unit of amplitude measurement of the outputted response signal waveform of the current amplifier is 2 V per grid. As shown in FIG. 4, the driven signal amplitude of the terahertz quantum cascade laser is 13.1 V, and the maximum value of the outputted signal amplitude of the current amplifier is $U_{max}$=6.38 V.

S6: comparing the dimension of the convergent spot at the convergent focal point with the size of the photosensitive surface of the terahertz quantum well detector, and calculating the largest area S" of the overlapable region therebetween, then a incident laser power P on the sensitive surface of the detector is that:

$$P = \alpha P' \frac{S''}{S'}$$

Wherein, α is transmittance of the window of the cooling Duwar of the terahertz quantum well detector at the laser frequency f.

In the present embodiment, the window 37 is high strength polyethylene material, with a thickness of 3 mm. Please refer to FIG. 5, which is shown to the transmission spectrum of a window of a cooling Dewar of a terahertz quantum well detector, it can be seen from FIG. 5 that, the transmittance of the window 37 at 3.902 THz is α=0.64.

In the present embodiment, since the size of the sensitive surface of the terahertz quantum well detector is larger than that of the converging spot, then S"=S', P=αP', with the result that the power of the incident laser on the sensitive surface of the detector is P=0.64×1200 μW=768 μW.

S7: according to the amplification sensitivity G of the current amplifier, the calculated photocurrent value generated by the terahertz quantum well detector is that I=G·$U_{max}$; according to the received laser power P and the generated photocurrent value by the terahertz quantum well detector, the responsivity value $R_f$ at the laser frequency f is obtained as:

$$R_f = \frac{G \cdot U_{max}}{P}.$$

As an example, the amplification sensitivity of the current amplifier is G=50 μA/V, the calculated photocurrent value generated by the terahertz quantum well detector is that I=G·U$_{max}$=50 μA/V×6.38 V=319 μA, then it can be calculated that the responsivity value of the calibrated terahertz quantum well detector at the frequency of 3.902 THz is that $R_f$=319 μA÷768 μW=0.415 A/W.

S8: according to the corresponding response amplitude a (a is less than 1) in the normalized photocurrent spectrum of the terahertz quantum well detector at the laser frequency f, the absolute responsivity $R_{max}$ of the terahertz quantum well detector at the detected peak frequency $f_{max}$ is calculated as:

$$R_{max} = R_f \frac{1}{a}$$

and according to the corresponding normalized response amplitude b (b is less than 1) at other frequency $f_j$, the absolute responsivity $R_j$ of the terahertz quantum well detector at the frequency is calculated as:

$$R_j = R_f \frac{b}{a}.$$

Specifically, according to FIG. 3, the corresponding responsivity amplitude of the normalized photocurrent spectrum of the terahertz quantum well detector at the frequency of 3.902 THz is that a=0.65, then it can be calculated that the absolute responsivity value of the detector at the peak detecting frequency of 3.21 THz is that $R_{max}$=0.415 A/W÷0.65=0.638 A/W.

Similarly, according to the normalized response amplitude of b=0.58 at other frequency f (e.g., at 3.1 THz) (as shown in FIG. 3, 0.58@3.1 THz), it can be calculated that the absolute responsivity value of the detector at this frequency is that $R_j$=0.638 A/W×0.58=0.370 A/W.

From the above steps, with a working bias voltage of 40 mV, and a working temperature of 3.2 K, the peak responsivity and the responsivity at other detectable frequencies of the terahertz quantum well detector with a peak detecting frequency of 3.21 THz can be obtained.

The above is merely exemplary, as for a terahertz quantum well detector with other parameters, similarly, the absolute responsivity value at any detectable frequency can be calculated by the above method.

In the calibration method of the present invention, the single frequency laser source with periodically output is adopted as a calibration photosource, the terahertz array detector and the dynamometer are adopted to directly measure and obtain the incident power of the calibrated detector, which greatly reduces the effect caused by background light and water vapor absorption in the conventional calibration methods, avoids the complicated calculation of various spectrum integration, thereby the total calibration process is simple, the introduced error is small, and the present invention has wide applicability.

To sum up, in the calibration method and device for an absolute responsivity of a terahertz quantum well detector of the present invention, since a single frequency laser source with periodically output is served as a calibration photosource, the periodicity of the photosource can be locked-in by means of the periodical sampling of the oscilloscope, thereby avoiding the random perturbed influence of infrared light and visible light in environment; during the calibration process, the water vapor absorption and the window absorption can be simplified as a single absorption coefficient due to the single frequency property of the light source, thereby avoiding the complicated integral differential calculation; moreover, the incident laser power of the calibrated detector is obtained by adopting the terahertz array detector and the dynamometer, which can further reduce the influence of water vapor absorption in the calibration process, so that the calibration results can be more accuracy. In the present invention, the absolute responsivity values at any frequency within the detectable frequency range can be obtained by the terahertz quantum well detector, which greatly improves the calibration accuracy and calibration efficiency of the detector, and has wide applicability. Therefore, the present invention effectively overcomes a variety of disadvantages in the prior art and has high industrial utility value.

The abovementioned embodiments only illustratively describe the principle and efficacy of the present invention, rather than being used to limit the present invention. Any person skilled in the art may modify or amend the abovementioned embodiments without departing from the spirit and scope of the present invention. Thus, all equivalent modifications or amendments accomplished by persons having common knowledge in the technical field concerned without departing from the spirit and technical thoughts revealed by the present invention shall still be covered by the claims of the present invention.

What is claimed is:

1. A device for calibrating an absolute responsivity of a terahertz quantum well detector, at least comprising: a driving power supply, a single frequency laser source, an optic, a terahertz array detector, a terahertz dynamometer, a current amplifier and an oscilloscope, characterized in that,
   the single frequency laser source is connected with the driving power supply, for radiating terahertz laser by the driving signal of the driving power supply;
   the optic is placed at one side of the single frequency laser source, for converging the terahertz laser;
   the terahertz array detector is placed at one side of the optic, for measuring a cross-sectional shape of a convergent spot at a convergent focal point of the terahertz laser;
   the terahertz dynamometer is placed at one side of the optic, for measuring the total power of the convergent spot at the convergent focal point;
   the current amplifier is used for powering the terahertz quantum well detector, and extracting and amplifying a loop current as a voltage signal;
   the oscilloscope is respectively connected with the current amplifier and the driving power supply, for displaying and reading the voltage signal, a external trigger signal in the display process is a reference signal outputted by the driving power supply.

2. The device for calibrating an absolute responsivity of a terahertz quantum well detector according to claim 1, characterized in that, the single frequency laser source is a terahertz quantum cascade laser or a carbon dioxide gas laser.

3. The device for calibrating an absolute responsivity of a terahertz quantum well detector according to claim 1, characterized in that, the optic is a set of polyethylene lenses, at least including two polyethylene lenses.

4. The device for calibrating an absolute responsivity of a terahertz quantum well detector according to claim 1, characterized in that, the driving power supply is a pulse signal generator.

5. The device for calibrating an absolute responsivity of a terahertz quantum well detector according to claim 1, characterized in that, the oscilloscope is a digital oscilloscope, at least including two measurable channels.

6. A method for calibrating an absolute responsivity of a terahertz quantum well detector by adopting the device according to claim 1, characterized in that, at least comprising the following steps:
- S1: driving the single frequency laser source by a square signal of the driving power supply with an output period oft, to make the single frequency laser source radiate a terahertz laser with the same period of the driving signal, and with a frequency of f;
- S2: adjusting the optic to a preset location, to make the terahertz laser reach a converging focal point through the optic;
- S3: placing the terahertz array detector at the converging focal point, and measuring the cross-sectional shape of the convergent spot at the convergent focal point, to calculate the cross-sectional area S';
- S4: placing the terahertz dynamometer at the convergent focal point, and measuring the total power P' of the convergent spot at the convergent focal point;
- S5: placing the terahertz quantum well detector at the convergent focal point, and powering the terahertz quantum well detector by the current amplifier, and extracting and amplifying the loop current as a voltage signal U, using the oscilloscope to display and to read the voltage signal U, and serving the external trigger signal displayed on the oscilloscope as the reference signal outputted by the driving power supply, then adjusting the location of the terahertz quantum well detector to make the voltage signal U displayed on the oscilloscope reach a maximum value $U_{max}$;
- S6: comparing the dimension of the convergent spot at the convergent focal point with the size of the photosensitive surface of the terahertz quantum well detector, and calculating the largest area S" of the overlapable region therebetween, then incident laser power P on the sensitive surface of the detector is that:

$$P = \alpha P' \frac{S''}{S'}$$

wherein, $\alpha$ is a transmittance of the window of the cooling Duwar of the terahertz quantum well detector at the laser frequency f;

- S7: according to the amplification sensitivity G of the current amplifier, the calculated photocurrent value generated by the terahertz quantum well detector is that $I=G \cdot U_{max}$; according to the received laser power P and the generated photocurrent value I by the terahertz quantum well detector, the responsivity value $R_f$ at the laser frequency f is obtained as:

$$R_f = \frac{G \cdot U_{max}}{P}$$

- S8: according to the corresponding response amplitude a (a<1) in the normalized photocurrent spectrum of the terahertz quantum well detector at the laser frequency f, the absolute responsivity $R_{max}$ of the terahertz quantum well detector at the detected peak frequency $f_{max}$ is calculated as:

$$R_{max} = R_f \frac{1}{a}$$

and according to the corresponding normalized response amplitude b (b<1) at other frequency $f_j$, the absolute responsivity $R_j$ of the terahertz quantum well detector at the frequency is calculated as:

$$R_j = R_f \frac{b}{a}.$$

7. The method according to claim 6, characterized in that, in step S3, the cross-sectional area S' is calculated by a circular area approximated method.

8. The method according to claim 6, characterized in that, the sensitivity surface area of the terahertz dynamometer is larger than the area of the convergent spot; in step S4, the laser power measured by the terahertz dynamometer is the total power of the convergent spot, and the average power of the measured convergent spots is obtained, then the total peak power of the convergent spots is calculated as twice of the average power according to the duty ratio of 50% of the square signal.

* * * * *